Aug. 13, 1946.  G. E. DATH  2,405,644
FRICTION SHOCK ABSORBER
Filed Dec. 2, 1943

Inventor
George E. Dath
By Henry Fuchs
Atty.

Patented Aug. 13, 1946

2,405,644

UNITED STATES PATENT OFFICE 2,405,644

FRICTION SHOCK ABSORBER

George E. Dath, Chicago, Ill., assignor to W. H. Miner, Inc., Chicago, Ill., a corporation of Delaware Application December 2, 1943, Serial No. 512,521

14 Claims. (Cl. 267—9)

This invention relates to improvements in friction shock absorbers, especially adapted for use in connection with truck springs of railway cars for snubbing or dampening the action of the truck springs.

One object of the invention is to provide a combined spring and friction shock absorber of simple design which may be readily assembled and wherein the parts are held in assembled relation and held against separation by shouldered engagement between certain of the parts thereof.

A more specific object of the invention is to provide a shock absorber of the character indicated comprising a friction shell, which is divided lengthwise into two sections which are slidable lengthwise with respect to each other, and friction shoes, each shoe having sliding engagement with one of the sections of the friction shell and hinged engagement with the other section of the shell and slidable in unison therewith, wherein relative movement of the shoes and sections of the shell with which they have sliding engagement is yieldingly resisted by spring means which also urges the shoes into frictional engagement with the friction shell sections by tilting said shoes against said shell sections with which they have sliding engagement.

Other objects of the invention will more clearly appear from the description and claims hereinafter following.

Figure 1:
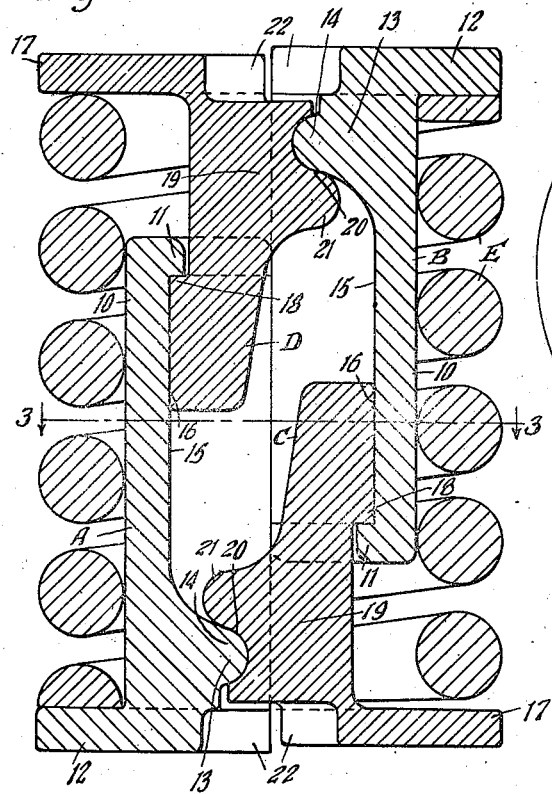
Figure 2:
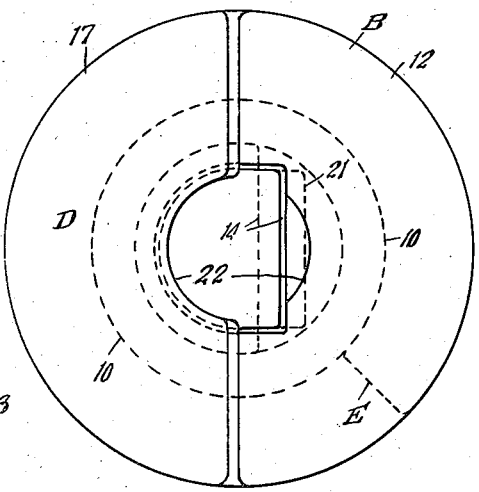
Figure 3:
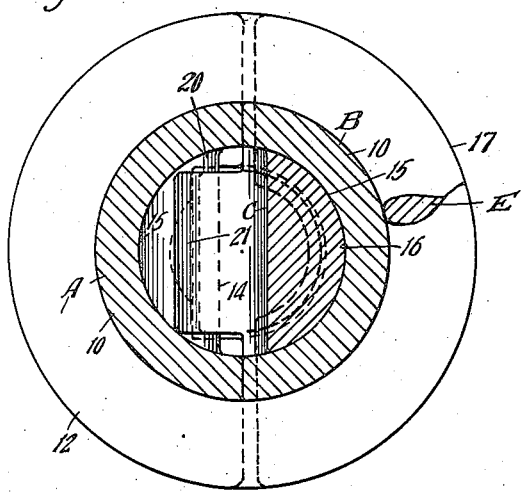

In the drawing forming a part of this specification, Figure 1 is a transverse vertical sectional view of my improved shock absorber, said section being on a plane coincident with the central vertical axis of the mechanism. Figure 2 is a top plan view of Figure 1. Figure 3 is a horizontal sectional view, corresponding substantially to the line 3—3 of Figure 1.

Referring to said drawing, my improved shock absorber comprises broadly two heavy, transversely curved, friction members or half friction shell sections A and B, together forming a complete cylindrical friction shell which is split lengthwise; two friction shoes C and D; and a spring resistance E.

The friction shell sections or members A and B, which together form the complete, longitudinally split, cylindrical friction shell, are identical, each section or friction member forming one half of the shell, which is divided lengthwise. Each friction member or half section of the shell, which is preferably in the form of a casting, comprises a relatively thick, longitudinally extending, transversely curved, side wall 10, having an inturned, relatively narrow stop flange 11 at one end, and a relatively heavy, horizontally disposed, outturned base flange 12 at the other end. The base flange 12 is curved and extends completely around the half section. At the base flange end portion thereof, the wall 10 is inwardly enlarged or thickened, as indicated at 13. The inward enlargement 13 is provided with a transversely extending bearing projection 14, which is rounded to provide a cylindrical bearing surface. Between the bearing projection 14 and the stop flange 11, the friction member or half section of the cylinder is provided with a longitudinally extending interior friction surface 15, which is transversely curved.

The friction members or shell sections A and B are reversely arranged end for end with the longitudinal edges of the side walls 10—10 thereof in lengthwise sliding engagement, that is, the section B is in inverted position with respect to the section A, the latter having its flange 12 at the bottom of the mechanism with the wall 10 projecting upwardly therefrom and the section B having its flange 12 at the top of the mechanism with the wall 10 depending therefrom.

The friction shoes C and D are of like design. Each shoe is in the form of a heavy block having a longitudinally extending, transversely curved or rounded friction surface 16 on the outer side thereof. Each shoe is provided with a laterally, outwardly extending, horizontally disposed flange 17 at its base, which is of arc-shaped form. Between the base flange 17 and the friction surface 16, the outer side of the shoe is cut away, or inwardly offset, providing a horizontal stop shoulder 18 at the inner end of the friction surface. On the inner side, each shoe is provided with a lateral enlargement 19 at the base portion thereof. A transversely extending concave bearing seat 20 is provided in said enlargement 19 for a purpose hereinafter described.

The shoes D and C are disposed respectively at the top and bottom of the mechanism with the friction surfaces 16—16 thereof respectively engaged with the interior friction surfaces 15—15 of the friction members, or friction shell sections A and B, and the base flanges 17—17 thereof in vertical alignment with the flanges of said friction members A and B, respectively. The shoe C is hingedly or pivotally connected to the friction member A by means of the bearing projection 14 of the member being engaged in the seat 20 of the shoe. The shoe D is connected to the friction member B in a similar manner, the bearing projection 14 of the latter being engaged in the seat 20 of said shoe. The shoe C has a rounded bearing projection 21 above the seat 20 which forms a fulcrum on which the shoe may rock on the upper side of the enlargement 13 of the friction member A, said upper side being preferably curved for this purpose. The shoe D has a similar bearing projection below the seat 20 thereof which serves the same purpose as the projection 21 of the shoe C and is also indicated by 21.

As shown most clearly in Figure 1, the flanges 17 of the shoes C and D are of lesser thickness than the flanges of the friction members A and B, and the flange 17 at each end of the mechanism is offset slightly in vertical direction with respect to the flange 12 at the corresponding end of the mechanism. In other words, the flange 17 of the shoe C normally has the top surface thereof aligned with the top surface of the flange 12 of the friction member A and its bottom surface upwardly offset with respect to said flange 12, while the flange 17 of the shoe D has its bottom surface aligned with the bottom surface of the flange 12 of the friction member B and its top surface offset downwardly with respect to the top surface of said flange 12. It will thus be evident, when the shock absorber is in place between the spring plate follower members of a truck spring cluster, the offset arrangement of the flanges 12 and 17 provides the required clearance to permit necessary swinging movement of the shoes about their hinged connections with the friction members or friction shell sections to place the friction surfaces of the shoe and friction member in tight frictional contact.

The spring resistance E comprises a single coil which surrounds the friction shell sections or friction members A and B and closely embraces the latter. The spring resistance E has its top end bearing on the flange 12 of the friction member B and the flange 17 of the shoe D, and its bottom end bearing on the flange 12 of the friction member A and the flange 17 of the shoe C, and said spring E in the assembled condition of the mechanism is under initial compression, thereby yieldingly urging the shoes to tilt against the friction surfaces of the friction members to assure the desired frictional resistance between the parts.

When assembled with the truck springs, my improved shock absorber is held centered by the usual spring centering projections of the top and bottom spring plates seated in pockets 22—22 in the base portions of the friction members and shoes, each pocket 22 being formed partly in one of the friction members and the shoe which is hinged thereto.

In assembling the mechanism, the shoe C is first connected to the friction member A by engaging the bearing projection in the seat 20 of the shoe. The coil spring E is then telescoped over the assembled parts A and C. After the spring E has been placed in position, the friction member B is inserted within the spring through the open upper end of the latter, the shoe C being tilted so that the shoulder 18 thereof clears the stop flange 11 of the friction member B. When the flange 11 has passed the shoulder 18, the shoe is permitted to swing to its normal position with the shoulder 18 engaged over the flange 11. Next, the shoe D is applied, the same being inserted with the coil spring between the friction members B and A, while held in tilted position to clear the flange 11 of the friction member A and the bearing projection 14 of the friction member B. When the shoe has been brought into proper position it is righted to engage the seat 20 thereof over the bearing projection 14 of the member B and the shoulder 18 underneath the stop flange 11 of the member A.

The improved shock absorber illustrated herein preferably replaces one of the spring units of a truck spring cluster of a railway car; however, several of such units may be employed in a spring cluster replacing two or more units of the same.

The operation of my improved shock absorber is as follows: Upon the spring cluster of the truck of a railway car being compressed between the spring follower plates of said cluster, the shock absorbing unit, which is disposed between said follower plates, is compressed therewith, thereby forcing the friction members or shell sections A and B to slide lengthwise with respect to each other and the shoes C and D to slide lengthwise on the friction surfaces of said friction members B and A, respectively. At the same time, due to the pressure exerted by the spring E on the base flanges of the shoes, the latter are tilted into tight frictional contact with the friction surfaces of the members A and B. High frictional resistance is thus provided to snub the action of the truck springs. As the follower plates of the truck springs are separated, due to recoil of the springs, the friction member A and shoe C are separated with respect to the friction member B and the shoe D, in lengthwise direction, by the expensive action of the spring E, thereby restoring all of the parts to normal full release position, lengthwise movement of the shoes with respect to the friction members A and B being limited by the stop flanges 11 of the latter coming into engagement with the shoulders 18 of the shoes D and C.

I have herein shown and described what I now consider the preferred manner of carrying out my invention, but the same is merely illustrative and I contemplate all changes and modifications that come within the scope of the claims appended hereto.

I claim:

1. In a friction shock absorber, the combination with a friction member; of a second friction member, said members having friction surfaces on the inner sides thereof; a pair of friction shoes between said members, one of said shoes being pivoted to said first named member and having sliding frictional engagement with the friction surface of said second named member, the other shoe being pivoted to said second named member and having sliding engagement with said first named member; and spring resistance means opposing relative sliding movement of said shoes and members toward each other and pressing the shoes against the friction surfaces of said members.

2. In a friction shock absorber, the combination with a friction member having a laterally projecting flange at the upper end thereof; of a second friction member having a laterally projecting flange at the lower end thereof, said members having friction surfaces on the inner sides thereof; a pair of friction shoes between said members, one of said shoes being pivoted to said first named member and having sliding frictional engagement with the friction surface of said second named member, said shoe having a laterally projecting flange at the upper end thereof, the other shoe being pivoted to said second named member and having sliding engagement with said first named member, said last named shoe having a laterally projecting flange at the lower end thereof; and spring resistance means interposed between the flanges of said members and shoes yieldingly resisting relative movement of said shoes and members toward each other lengthwise of the mechanism, and tilting movement of said shoes away from the friction surfaces of said members.

3. In a friction shock absorber, the combination with an upper friction member having a laterally outwardly projecting flange at the upper end thereof; of a lower friction member having a laterally outwardly projecting flange at the lower end thereof, said members having longitudinally extending friction surfaces on the inner sides thereof; a pair of friction shoes between said members, said shoes being disposed respectively at the upper and lower ends of the mechanism, said upper shoe being pivoted to said upper member and having sliding frictional engagement with the friction surface of said lower member, said shoe having a laterally outwardly projecting flange at the upper end thereof, said lower shoe being pivoted to said lower member and having sliding frictional engagement with the friction surface of said upper member, said last named shoe having a laterally outwardly projecting flange at the lower end thereof; and spring resistance means bearing respectively at its top and bottom ends on the flanges of said upper member and shoe, and the flanges of said lower member and shoe, yieldingly opposing relative approach of said upper and lower members and shoes.

4. In a friction shock absorber, the combination with upper and lower friction members movable lengthwise with respect to each other, each friction member having a transversely curved, longitudinally extending friction surface on the inner side thereof, said upper member having a laterally outwardly projecting flange at the upper end thereof, and said lower member having a laterally outwardly projecting flange at the lower end thereof; of upper and lower friction shoes having longitudinally extending, transversely curved, friction surfaces, said upper and lower shoes being pivoted respectively to said upper and lower members and having sliding frictional engagement respectively with the friction surfaces of said lower and upper members, said upper shoe having a laterally outwardly projecting flange at the upper end thereof, and said lower shoe having a laterally outwardly projecting flange at the lower end thereof; and spring resistance means interposed between the flanges of said upper member and shoe and the flanges of said lower member and shoe opposing relative approach of said members and shoes.

5. In a friction shock absorber, the combination with a two-part sectional friction shell divided lengthwise into half sections, said sections having friction surfaces on the inner sides thereof, said sections being slidable lengthwise with respect to each other; of a pair of friction shoes at opposite ends of said sectional friction shell, the shoe at one end of said shell being pivoted to one of said half sections and having sliding frictional engagement with the other half section, and the shoe at the other end of the shell being pivoted to said last named half section and having sliding frictional engagement with the first named half section; and spring resistance means opposing relative sliding movement of said shoes and shell sections toward each other and pressing said shoes against said friction surfaces.

6. In a friction shock absorber, the combination with a two-part cylindrical friction shell divided lengthwise into opposed half sections, said half sections having friction surfaces on the inner sides thereof, said half sections being slidable lengthwise with respect to each other; of a pair of friction shoes, said shoes being respectively at opposite ends of said divided shell, said shoes being pivoted to said opposed half sections respectively and having sliding frictional engagement with the half section opposed to the half section to which it is pivoted, one of said half sections having a laterally outwardly projecting flange at one end of said shell, and the other half section having a laterally outwardly projecting flange at the other end, and said shoes having laterally outwardly projecting flanges at their outer ends; and spring resistance means surrounding said two-part shell and bearing at opposite ends on the flanges of said shoes and half sections of the shell.

7. In a friction shock absorber, the combination with a longitudinally divided, cylindrical friction shell, comprising a half section having a laterally outwardly projecting flange at one end and a second half section having a laterally outwardly projecting flange at the end thereof remote from the flanged end of said first named half section, said half sections having longitudinally extending, transversely curved, opposed, interior friction surfaces; of a pair of friction shoes having frictional sliding engagement respectively with the friction surfaces of said first and second named half sections and pivotal engagement respectively with said second and first named sections, said shoes having laterally outwardly projecting flanges at the outer ends thereof; and spring means surrounding said friction shell and bearing at opposite ends respectively on the flanges of said respective half sections of the shell and respectively on the flanges of said shoes.

8. In a friction shock absorber, the combination with a friction member; of a second friction member, said members having friction surfaces on the inner sides thereof; a pair of friction shoes between said members, one of said shoes being pivoted to said first named member and having sliding frictional engagement with the friction surface of said second named member, the other shoe being pivoted to said second named member and having sliding engagement with said first named member, said shoes having shouldered engagement with said members to limit relative longitudinal separation of said shoes and members; and spring resistance means opposing relative sliding movement of said shoes and members toward each other and pressing the shoes against the friction surfaces of said members.

9. In a friction shock absorber, the combination with a friction member having a laterally projecting flange at the upper end thereof; of a second friction member having a laterally projecting flange at the lower end thereof, said members having friction surfaces on the inner sides thereof; a pair of friction shoes between said members, one of said shoes being pivoted to said first named member and having sliding frictional engagement with the friction surface of said second named member, said shoe having a laterally projecting flange at the upper end thereof, the other shoe being pivoted to said second named member and having sliding engagement with said first named member, said last named shoe having a laterally projecting flange at the lower end thereof; and a coil spring surrounding said members and interposed between the flanges of said members and shoes, yieldingly resisting relative movement of said shoes and members lengthwise of the mechanism toward each other, and tilting movement of said shoes away from the friction surfaces of said members.

10. In a friction shock absorber, the combination with an upper friction member having a laterally outwardly projecting flange at the upper end thereof; of a lower friction member having a laterally outwardly projecting flange at the lower end thereof, said members having longitudinally extending friction surfaces on the inner sides thereof; a pair of friction shoes between said members, said shoes being disposed respectively at the upper and lower ends of the mechanism, said upper shoe being pivoted to said upper member and having sliding frictional engagement with the friction surface of said lower member, said shoe having a laterally outwardly projecting flange at the upper end thereof, said lower shoe being pivoted to said lower member and having sliding frictional engagement with the friction surface of said upper member, said last named shoe having a laterally outwardly projecting flange at the lower end thereof; and a coil spring surrounding said members and bearing respectively at its top and bottom ends on the flanges of said upper member and shoe, and the flanges of said lower plate member and shoes, yieldingly opposing relative approach of said upper and lower members and shoes.

11. In a friction shock absorber, the combination with upper and lower friction members movable lengthwise with respect to each other, each friction member having a transversely curved, longitudinally extending friction surface on the inner side thereof, said upper member having a laterally outwardly projecting flange at the upper end thereof, and said lower member having a laterally outwardly projecting flange at the lower end thereof; of upper and lower friction shoes having longitudinally extending, transversely curved friction surfaces, said upper and lower shoes being pivoted respectively to said upper and lower members and having sliding frictional engagement respectively with the friction surfaces of said lower and upper members, said upper shoe having a laterally outwardly projecting flange at the upper end thereof, and said lower shoe having a laterally outwardly projecting flange at the lower end thereof, said upper member having a stop flange at the lower end thereof, said lower member having a stop flange at the upper end thereof, and said lower and upper shoes having shouldered engagement with said stop flanges to limit lengthwise separation of said shoes and members; and spring resistance means interposed between the flanges of said upper member and shoe and the flanges of said lower member and shoe opposing relative approach of said members and shoes.

12. In a friction shock absorber, the combination with a two-part sectional friction shell divided lengthwise into half sections, said sections having friction surfaces on the inner sides thereof, said sections being slidable lengthwise with respect to each other; of a pair of friction shoes at opposite ends of said sectional friction shell, the shoe at one end of said shell being pivoted to one of said half sections and having sliding frictional engagement with the other half section, and the shoe at the other end of the shell being pivoted to said last named half section and having sliding frictional engagement with the first named half section; and a coil spring surrounding said friction shell and closely embracing the same, said spring opposing relative sliding movement toward each other of said shoes and shell sections and pressing said shoes against friction surfaces.

13. In a friction shock absorber, the combination with a two-part cylindrical friction shell divided lengthwise into opposed half sections, said half sections having friction surfaces on the inner sides thereof, said half sections being slidable lengthwise with respect to each other; of a pair of friction shoes, said shoes being respectively at opposite ends of said divided shell, said shoes being pivoted to said opposed half section repectively and having sliding frictional engagement with the half section opposed to the half section to which it is pivoted, one of said half sections having a laterally outwardly projecting flange at one end of said shell, and the other half section having a laterally outwardly projecting flange at the other end, and said shoes having laterally outwardly projecting flanges at their outer ends; and a coil spring surrounding said two-part shell and closely embracing the same and bearing at opposite ends on the flanges of said shoes and half sections of the shell.

14. In a friction shock absorber, the combination with a longitudinally divided, cylindrical friction shell, comprising a half section having a laterally outwardly projecting flange at one end, and a second half section having a laterally outwardly projecting flange at the end thereof remote from the flanged end of said first named half section, said half sections having longitudinally extending, transversely curved, opposed, interior friction surfaces; of a pair of friction shoes having frictional sliding engagement respectively with the friction surfaces of said first and second named half sections and pivotal engagement respectively with said second and first named sections, said shoes having laterally outwardly projecting flanges at the outer ends thereof; and a coil spring closely surrounding said friction shell and bearing at opposite ends respectively on the flanges of said respective half sections of the shell and respectively on the flanges of said shoes.

GEORGE E. DATH.